United States Patent
Wu et al.

(10) Patent No.: US 11,772,973 B2
(45) Date of Patent: Oct. 3, 2023

(54) SUPER-HYDROPHILIC CARBON NANOTUBE COMPOSITE FILM AND METHOD FOR MAKING THE SAME

(71) Applicants: Tsinghua University, Beijing (CN); HON HAI PRECISION INDUSTRY CO., LTD., New Taipei (TW)

(72) Inventors: Yang Wu, Beijing (CN); Shuai Liang, Beijing (CN); Xia Huang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 202 days.

(21) Appl. No.: 17/342,845

(22) Filed: Jun. 9, 2021

(65) Prior Publication Data
US 2021/0395089 A1 Dec. 23, 2021

(30) Foreign Application Priority Data
Jun. 22, 2020 (CN) .......................... 202010576949.1

(51) Int. Cl.
*C01B 32/162* (2017.01)
*B82Y 30/00* (2011.01)
(Continued)

(52) U.S. Cl.
CPC .......... *C01B 32/162* (2017.08); *C01B 32/168* (2017.08); *C08G 73/02* (2013.01);
(Continued)

(58) Field of Classification Search
CPC . C01B 32/162; C01B 32/168; C01B 2202/02; B08G 73/02; C08J 3/203;
(Continued)

(56) References Cited

U.S. PATENT DOCUMENTS
9,073,753 B2 7/2015 Tao et al.

FOREIGN PATENT DOCUMENTS

| CN | 102452646 | 5/2012 |
|----|-----------|--------|
| CN | 106178986 | 12/2016 |
| CN | 106215723 | 12/2016 |

OTHER PUBLICATIONS

Liu, Yanan, et al. "Antifouling, high-flux oil/water separation carbon nanotube membranes by polymer-mediated surface charging and hydrophilization." Journal of Membrane Science 542 (2017): 254-263.*

(Continued)

*Primary Examiner* — Richard M Rump
(74) *Attorney, Agent, or Firm* — ScienBiziP, P.C.

(57) ABSTRACT

A super-hydrophilic carbon nanotube composite film includes a carbon nanotube layer, a polydopamine layer and a silicon dioxide layer. The carbon nanotube layer includes a plurality of carbon nanotubes and defines two opposite surfaces. The polydopamine layer is on at least one surface of two opposite surfaces of the carbon nanotube layer, and the polydopamine layer includes a plurality of polydopamine nanoparticles. The silicon dioxide layer is on a surface of the polydopamine layer away from the carbon nanotube layer, and the silicon dioxide layer includes a plurality of amino-containing silica nanoparticles, and the plurality of amino-containing silica nanoparticles are grafted onto the surface of the polydopamine layer.

14 Claims, 14 Drawing Sheets

S1: providing at least two stacked and crossed primary carbon nanotube films 108, densifying the at least two stacked and crossed primary carbon nanotube films 108 to obtain a carbon nanotube layer 10 and the carbon nanotube layer 10 defines two opposite surfaces S2: coating a dopamine aqueous solution on at least one surface of the carbon nanotube layer 10 to form a polydopamine layer 20

S3: providing an amino-containing silica nanoparticle suspension, placing the carbon nanotube layer 10 with the polydopamine layer 20 in the amino-containing silica nanoparticle suspension to form a silicon dioxide layer 30 on a surface of the polydopamine layer 20 away from the carbon nanotube layer 10

(51) Int. Cl.
*B82Y 40/00* (2011.01)
*C09D 171/02* (2006.01)
*C08G 73/02* (2006.01)
*C01B 32/168* (2017.01)
*C08K 3/36* (2006.01)
*C08J 3/20* (2006.01)

(52) U.S. Cl.
CPC ............ *C08J 3/203* (2013.01); *C08K 3/36* (2013.01); *C09D 171/02* (2013.01); *B82Y 30/00* (2013.01); *B82Y 40/00* (2013.01); *C01B 2202/02* (2013.01); *C01P 2004/64* (2013.01); *C01P 2006/12* (2013.01); *C01P 2006/90* (2013.01); *C08J 2379/04* (2013.01); *C08K 2201/011* (2013.01)

(58) Field of Classification Search
CPC .. C08J 2379/04; C08K 3/36; C08K 2201/011; C09D 171/02; B82Y 30/00; C01P 2004/64; C01P 2006/12; C01P 2006/90
See application file for complete search history.

(56) References Cited

OTHER PUBLICATIONS

Gao, Shou Jian, et al. "Superwetting polymer-decorated SWCNT composite ultrathin films for ultrafast separation of oil-in-water nanoemulsions." Journal of Materials Chemistry A 3.6 (2015): 2895-2902.*

Jiang, Shangjie, et al. "A study on the stability of superhydrophobic paper reinforced by amino-assisted modified PHFMA-PTSPM polymer." Materials Research Express 7.10 (2020): 105301.*

Hong, Min-Sung, et al. "Polydopamine/carbon nanotube nanocomposite coating for corrosion resistance." Journal of Materiomics 6.1 (2020): 158-166.*

* cited by examiner

SUPER-HYDROPHILIC CARBON NANOTUBE COMPOSITE FILM AND METHOD FOR MAKING THE SAME

CROSS-REFERENCE TO RELATED APPLICATIONS

This application claims all benefits under 35 U.S.C. § 119 from the Chinese Patent Application No. 202010576949.1, filed on Jun. 22, 2020, in the China National Intellectual Property Administration, the disclosure of which is incorporated herein by reference.

FIELD

The present application relates to a super-hydrophilic carbon nanotube composite film and method for making the same.

BACKGROUND

The mushroom growth of the economy and industry has brought about a series of severe environmental problems. For example, water pollution has seriously threatened human health and social development. Oil-bearing wastewater has attracted great attention over the past few years due to discharge of the oily domestic sewage, oil refinery wastewater, industrial chemical leaks, and marine oil spills, etc. Such oily wastewater is already one type of common pollutants worldwide and becoming a serious global environment concern. Thus, how to separate oil/water mixtures, especially oil/water emulsions, is an urgent problem to be solved.

Conventional water and oil separation methods mainly include gravity separation, coagulation-flocculation, oil-absorbing materials, and air flotation. However, these conventional methods can only make certain effects in handing most immiscible free oil/water mixtures but are ineffectual in separating oil/water micro-emulsions and nano-emulsions. Demulsification with the addition of chemicals or exerting an electric field usually involves secondary pollution and energy consumption. Moreover, many porous oil-removing materials such as foams, sponges are disposable, which usually generate secondary environmental pollution.

In recent years, the concept of superwettability has been successfully introduced into the study field of oil/water separation. The "superwettability" means superhydrophobicity-superoleophilicity or superhydrophilicity-superoleophobicity. According to the different interface effects of water and oil, such superwetting materials demonstrate excellent selective superwettability to oil and water compared with traditional materials. A series of recent works on fabricating carbon nanotubes-based membranes have demonstrated their effectiveness and ultrahigh flux in separating oil/water mixtures or emulsions. Despite numerous advantages of CNTs, the intrinsic hydrophobic/oleophilic properties of CNTs would make them easily fouled by oil, which inevitably limits their wide application for oil/water separation.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views. Implementations of the present technology will be described, by way of example only, with reference to the attached figures

DETAILED DESCRIPTION

Figure 1:
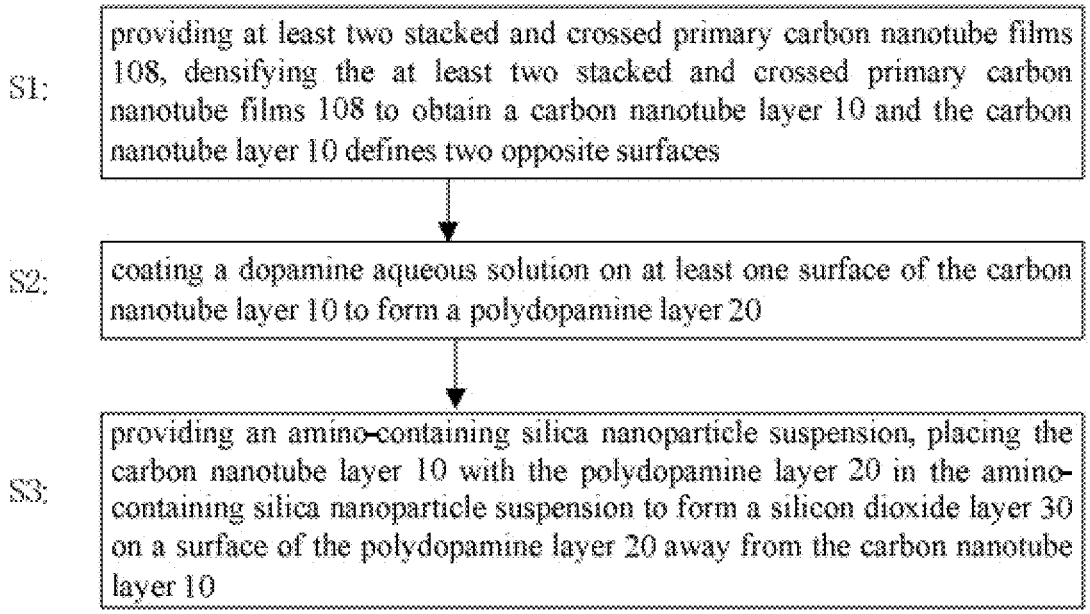
FIG. 1 is a flow chart of an embodiment of a method for making the super-hydrophilic carbon nanotube composite film.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape, or other feature that the term modifies, such that the component need not be exact. The term "comprising" means "including, but not necessarily limited to"; it specifically indicates open-ended inclusion or membership in a so-described combination, group, series, and the like. It should be noted that references to "an" or "one" embodiment in this disclosure are not necessarily to the same embodiment, and such references mean "at least one."

Figure 2:
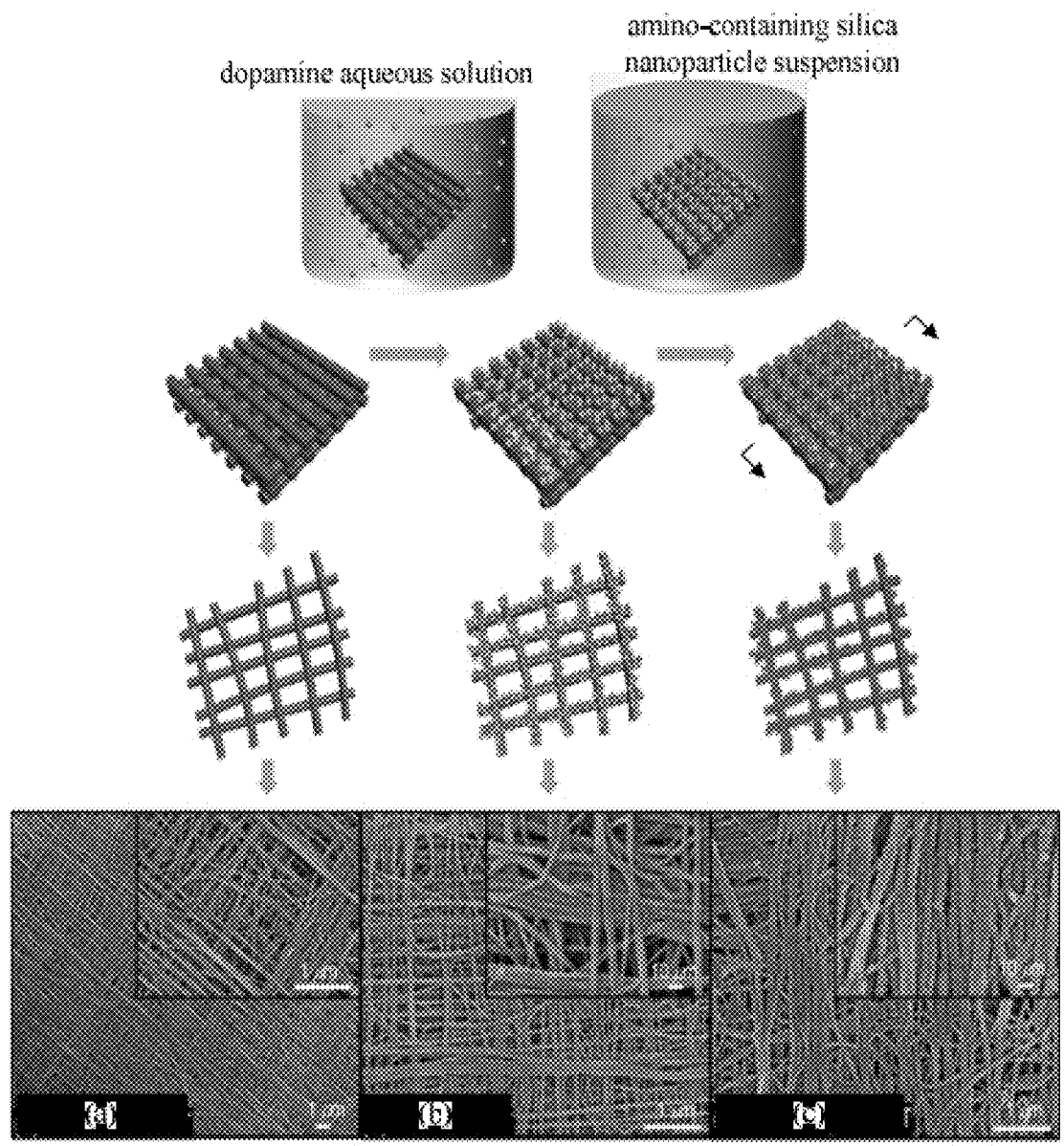
FIG. 2 is a schematic view of an embodiment of a method for making the super-hydrophilic carbon nanotube composite film.

Referring to FIG. 1 and FIG. 2, an embodiment of a method of making a super-hydrophilic carbon nanotube composite film 100 includes the following steps:

S1, providing at least two stacked and crossed primary carbon nanotube films 108, densifying the at least two stacked and crossed primary carbon nanotube films 108 to obtain a carbon nanotube layer 10, wherein the carbon nanotube layer 10 defines two opposite surfaces;

S2, coating a dopamine aqueous solution on at least one surface of the carbon nanotube layer 10 to form a polydopamine layer 20; and S3, providing an amino-containing silica nanoparticle suspension, placing the carbon nanotube layer 10 with the polydopamine layer 20 in the amino-containing silica nanoparticle suspension to form a silicon dioxide layer 30 on a surface of the polydopamine layer 20 away from the carbon nanotube layer 10.

In step S1, the at least two stacked and crossed primary carbon nanotube films 108 can include two primary carbon nanotube films 108, or include a plurality of carbon nanotube films 108. The primary carbon nanotube film 108 includes a plurality of carbon nanotubes joined by van der Waals attractive force therebetween. The primary carbon nanotube film 108 can be a substantially pure structure of carbon nanotubes, with few impurities. The primary carbon nanotube film 108 can be a freestanding structure, that is, the primary carbon nanotube film 108 can be supported by itself without a substrate. For example, if at least one point of the primary carbon nanotube film 108 is held, the entire primary carbon nanotube film can be lifted without being destroyed. The primary carbon nanotube film 108 with a plurality of carbon nanotubes also has a larger specific surface area because the carbon nanotube has a large specific surface area. The plurality of carbon nanotubes in the primary carbon nanotube film 108 are orderly arranged. The term 'ordered primary carbon nanotube film' refers to a structure where the carbon nanotubes are basically arranged in a same direction.

The primary carbon nanotube film 108 can be a drawn carbon nanotube film. A method of making the drawn carbon nanotube film includes the following steps:

S11, providing a carbon nanotube array; and
S12, pulling out at least one drawn carbon nanotube film from the carbon nanotube array.

In step S11, a method of making the carbon nanotube array includes the following steps:

S111, providing a substantially flat and smooth substrate;
S112, applying a catalyst layer on the substrate;
S113, annealing the substrate with the catalyst at a temperature in the approximate range of about 700 degrees Celsius to about 900 degrees Celsius in air for about 30 minutes to about 90 minutes;
S114, heating the substrate with the catalyst at a temperature in the approximate range from about 500 degrees Celsius to about 740 degrees Celsius in a furnace with a protective gas therein; and
S115, supplying a carbon source gas to the furnace for about 5 minutes to about 30 minutes and growing a super-aligned array of the carbon nanotubes from the substrate.

In step S111, the substrate can be a P or N-type silicon wafer. In one embodiment, a 4-inch P-type silicon wafer is used as the substrate.

In step S112, the catalyst can be made of iron (Fe), cobalt (Co), nickel (Ni), or any combination alloy thereof.

In step S114, the protective gas can be made of at least one of nitrogen ($N_2$), ammonia ($NH_3$), and a noble gas.

In step S115, the carbon source gas can be a hydrocarbon gas, such as ethylene ($C_2H_4$), methane ($CH_4$), acetylene ($C_2H_2$), ethane ($C_2H_6$), or any combination thereof.

In step S12, the drawn carbon nanotube film can be fabricated by the following steps:

S121: selecting one or more carbon nanotubes having a predetermined width from the array of the carbon nanotubes; and
S122: pulling the carbon nanotubes to obtain nanotube segments at a substantially even/uniform speed to achieve a uniform carbon nanotube film.

In step S121, the carbon nanotube segment includes a number of substantially parallel carbon nanotubes. The carbon nanotube segments can be selected by using an adhesive tape as a tool to contact the super-aligned array of carbon nanotubes.

In step S122, the pulling direction can be substantially perpendicular to the growing direction of the super-aligned array of carbon nanotubes.

More specifically, during the pulling process, as the initial carbon nanotube segments are drawn out, other carbon nanotube segments are also drawn out end to end due to van der Waals attractive force between ends of adjacent segments. This process of pulling produces a substantially continuous and uniform carbon nanotube film having a predetermined width.

After the step of S12, the drawn carbon nanotube film can be treated by applying organic solvent to the drawn carbon nanotube film and soaking the entire surface of the carbon nanotube film. The organic solvent is volatile and can be ethanol, methanol, acetone, dichloromethane, chloroform, or any appropriate mixture thereof. In the one embodiment, the organic solvent is ethanol. After being soaked by the organic solvent, adjacent carbon nanotubes in the carbon nanotube film that are able to do so, bundle together, due to the surface tension of the organic solvent as the organic solvent volatilizes. Due to the decrease of the specific surface area from bundling, the mechanical strength and toughness of the drawn carbon nanotube film increase and the coefficient of friction of the carbon nanotube films decreases. Macroscopically, the drawn carbon nanotube film will be an approximately uniform film. In one embodiment, a densified carbon nanotube layer 10 is obtained by immersing the primary carbon nanotube film 108 in ethanol for 20 minutes.

The width of the drawn carbon nanotube film depends on the size of the carbon nanotube array. The length of the drawn carbon nanotube film can be set as desired. In one embodiment, when the substrate is a four inch type wafer, a width of the carbon nanotube film can be in an approximate range from 1 centimeter (cm) to 10 cm, the length of the carbon nanotube film can reach to about 120 m, and the thickness of the drawn carbon nanotube film can be in a range from about 0.5 nm to about 100 microns. Multiple films can be adhered together to obtain a film of any desired size.

In step S2, the dopamine aqueous solution can be obtained by dissolving mixing dopamine hydrochloride in a tris solution. In one embodiment, 2 mg/mL dopamine hydrochloride is dissolved in a Tris buffer solution with a pH of 8.6 to form an aqueous dopamine solution. The polydopamine layer 20 formed on the surface of the carbon nanotube layer 10 can be obtained by coating the dopamine aqueous solution on one surface of the carbon nanotube layer 10 and leaving it to stand for a period of time. Alternatively, the dopamine aqueous solution is coated on both opposite surfaces of the carbon nanotube layer 10 to form the polydopamine layer 20 on both opposite surfaces of the carbon nanotube layer 10. In one embodiment, the polydopamine layer 20 is formed on only one surface of the carbon nanotube layer 10. When the dopamine aqueous solution coated on the surface of the carbon nanotube layer 10 is exposed to the air, a plurality of polydopamine nanoparticles in the dopamine aqueous solution undergo self-polymerization with oxygen to form the polydopamine layer 20. The polydopamine layer 20 includes a plurality of polydopamine nanoparticles, and the plurality of polydopamine nanoparticles are uniformly distributed on surfaces of the plurality of carbon nanotubes of the carbon nanotube layer 10. Furthermore, the carbon nanotube layer 10 attached with the polydopamine layer 20 is sufficiently washed with ultrapure water to remove unreacted or not firmly adsorbed monomers.

In step S3, a method for making the amino-containing silica nanoparticle suspension includes the following steps:
   S31, dispersing silica nanoparticles in ultrapure water and ultrasonically treating for 30 minutes to obtain a silica nanoparticle suspension;
   S32, dropping 3-amibopropyl-trimethoxysilane into ultrapure water to obtain a silane solution;
   S33, mixing the silica nanoparticle suspension with the silane solution to get a mixture, and adjusting the pH of the mixture to 5 with a hydrochloric acid solution; and
   S34, heating the mixture at 70 degrees Celsius and stirring the mixture at 700 rpm for 24 hours.

Furthermore, the method further includes putting the mixture into ultrapure water for dialysis for 48 hours to remove the unreacted monomers after the step S34.

The silicon dioxide layer 30 can be obtained by placing the carbon nanotube layer 10 in the amino-containing silica nanoparticle suspension for a period of time. The period of time can be selected according to needs. When the polydopamine layer 20 is coated on both opposite surfaces of the carbon nanotube layer 10 and the carbon nanotube layer 10 is placed in the amino-containing silica nanoparticle suspension, the silicon dioxide layer 30 can be formed on the polydopamine layer 20. Here, the polydopamine layer 20 coated on both opposite surfaces of the carbon nanotube layer 10 can be divided into a first polydopamine layer 20 on one surface of the carbon nanotube layer 10 and a second polydopamine layer 20 on the other surface of the carbon nanotube layer 10. Thus, the silicon dioxide layer 30 formed on the polydopamine layer 20 can also be divided into a first silicon dioxide layer 30 on the first polydopamine layer 20 and a second silicon dioxide layer 30 on the second polydopamine layer 20. In one embodiment, the silicon dioxide layer 30 is obtained by placing the carbon nanotube layer 10 in the amino-containing silica nanoparticle suspension for 12 hours, and the pH value of the amino-containing silica nanoparticle suspension is 7. The silicon dioxide layer 30 includes a plurality of amino-containing silica nanoparticles. The plurality of amino-containing silica nanoparticles are grafted onto the plurality of polydopamine nanoparticles in the polydopamine layer 20 by Michael addition reaction, thereby the silicon dioxide layer 30 is formed on the surface of the polydopamine layer 20.

Figure 3:
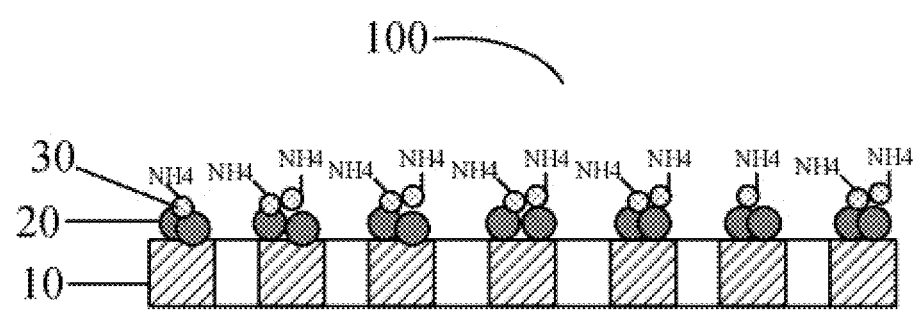
FIG. 3 is a schematic cross-sectional view of an embodiment of the super-hydrophilic carbon nanotube composite film.

Referring to FIG. 3, an embodiment of the super-hydrophilic carbon nanotube composite film 100 prepared by the above method is provided. The super-hydrophilic carbon nanotube composite film 100 includes the carbon nanotube layer 10, the polydopamine layer 20, and the silicon dioxide layer 30. The polydopamine layer 20 is located on the surface of the carbon nanotube layer 10. And the silicon dioxide layer 30 is located on the surface of the polydopamine layer 20 away from the carbon nanotube layer 10. The polydopamine layer 20 is between the carbon nanotube layer 10 and the silicon dioxide layer 30. The carbon nanotube layer 10 includes the plurality of carbon nanotubes, and defines two opposite surfaces. The polydopamine layer 20 includes a plurality of polydopamine nanoparticles. The plurality of polydopamine nanoparticles are located on the plurality of carbon nanotubes. The silicon dioxide layer 30 includes a plurality of amino-containing silica nanoparticles. The plurality of amino-containing silica nanoparticles are grafted onto the surface of the polydopamine layer 20. The super-hydrophilic carbon nanotube composite film 100 defines a plurality of micropores, and the plurality of micropores are formed by the plurality of carbon nanotubes, the plurality of polydopamine nanoparticles, and the plurality of amino-containing silica nanoparticles.

The carbon nanotube layer 10 is a layered structure formed by the plurality of carbon nanotubes. The plurality of carbon nanotubes extend along an extending direction and is joined end to end by van der Waals attraction forces. The plurality of carbon nanotubes along an extending direction can also join end to end by van der Waals attraction forces. The carbon nanotube layer 10 includes at least two carbon nanotube films stacked and intersected to form a plurality of holes. The pore size of the carbon nanotube layer 10 ranges from 10 nanometers to 600 nanometers. Furthermore, the pore size of the carbon nanotube layer 10 ranges from 50 nanometers to 500 nanometers. The carbon nanotube film includes a plurality of carbon nanotube wires. Each carbon nanotube wire extends through two opposite sides of the carbon nanotube film and includes a plurality of carbon nanotubes. The plurality of carbon nanotube wires are parallel to each other and arranged at intervals. In one embodiment, the carbon nanotube film is a super in-line carbon nanotube film.

Furthermore, the carbon nanotube layer 10 can be a free-standing structure. The term "free-standing structure" includes the carbon nanotube layer 10 that can sustain the weight of itself when it is hoisted by a portion thereof without any significant damage to its structural integrity. The plurality of carbon nanotubes can be single-walled carbon nanotubes, double-walled carbon nanotubes, or multi-walled carbon nanotubes. The length and diameter of the plurality of carbon nanotubes can be selected according to need. A diameter of the single-walled carbon nanotubes can be from about 0.5 nanometers to about 10 nanometers. A diameter of the double-walled carbon nanotubes can be from about 1.0 nanometer to about 15 nanometers. A diameter of the multi-walled carbon nanotubes can be from about 1.5 nanometers to about 50 nanometers. Referring to FIG. 2, the carbon nanotube films of the carbon nanotube layer 10 are stacked to form a porous structure. In one embodiment, the carbon nanotube layer 10 includes one hundred layers of carbon nanotube films, and the one hundred carbon nanotube films are stacked and the extension directions of the lengths of the carbon nanotubes in two adjacent carbon nanotube layers are perpendicular to each other.

The polydopamine layer 20 is located on the carbon nanotube layer 10. The plurality of polydopamine nanoparticles of the polydopamine layer 20 are adhered to at least one surface of the two opposite surfaces of the carbon nanotube layer 10. Due to the plurality of polydopamine nanoparticles are adhesive, the plurality of polydopamine nanoparticles can be adhered to surfaces of the plurality of carbon nanotubes of the carbon nanotube layer 10. The polydopamine nanoparticles are spherical particles. The diameter of each polydopamine nanoparticle ranges from 20 nanometers to 30 nanometers. Referring to FIG. 2, the plurality of polydopamine nanoparticles are uniformly gathered on the surface of the carbon nanotube layer 10 to form a rough layer with a micro/nano structure, and the surface roughness of the carbon nanotube layer 10 with the plurality of polydopamine nanoparticles is greater than that of the carbon nanotube layer 10 without the plurality of polydopamine nanoparticles.

The silicon dioxide layer 30 is located on the polydopamine layer 20. When the polydopamine layer 20 is located on both opposite surfaces of the carbon nanotube layer 10, the silicon dioxide layer 30 is located on the surface of each polydopamine layer 20 away from the carbon nanotube layer 10. The plurality of amino-containing silica nanoparticles are grafted onto the polydopamine layer 20 by Michael addition reaction or Schiff base reaction. The plurality of amino-containing silica nanoparticles are grafted on the plurality of polydopamine nanoparticles. The diameter of the amino-containing silica nanoparticles ranges from 10 nanometers to 20 nanometers. Referring to FIG. 2, the average volume of the amino-containing silica nanoparticles is smaller than that of the polydopamine nanoparticles, thus the silicon dioxide layer 30 and the polydopamine layer 20 form a double-layer nanoparticle structure on the carbon nanotube layer 10, and the silica nanoparticles are connected with amino groups. Therefore, the double-layer nanoparticle structure and the amino groups can form a three-dimensional micro-nano structure. The three-dimensional micro-nano structure can trap water or air, thus the three-dimensional micro-nano structure can enhance superwetness of a membrane and prevent oil immersion and adhesion. Since the plurality of polydopamine nanoparticles and the plurality of amino-containing silica nanoparticles cover the carbon nanotube layer 10, parts of the pores of the carbon nanotube layer 10 are blocked, therefore the pores of the super-hydrophilic carbon nanotube composite film 100 are slightly smaller than the pores of the carbon nanotube layer 10.

Figure 4:
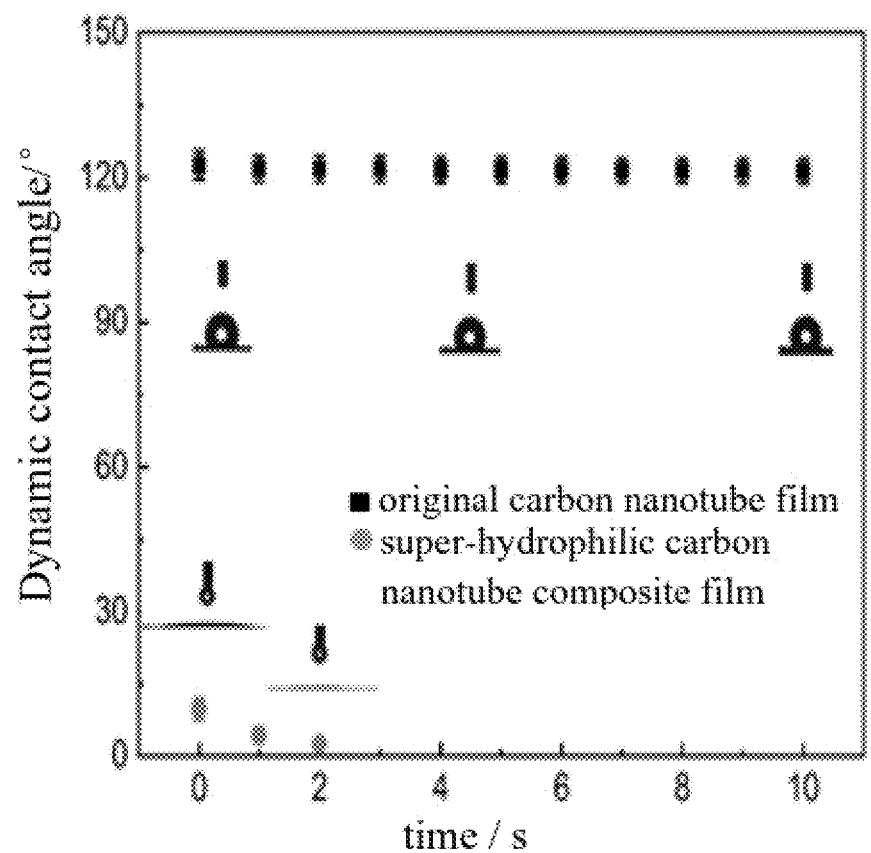
FIG. 4 is a schematic view of a dynamic diffusion and permeation process of water droplets on a original carbon nanotube film and the super-hydrophilic carbon nanotube composite film.
Figure 5:
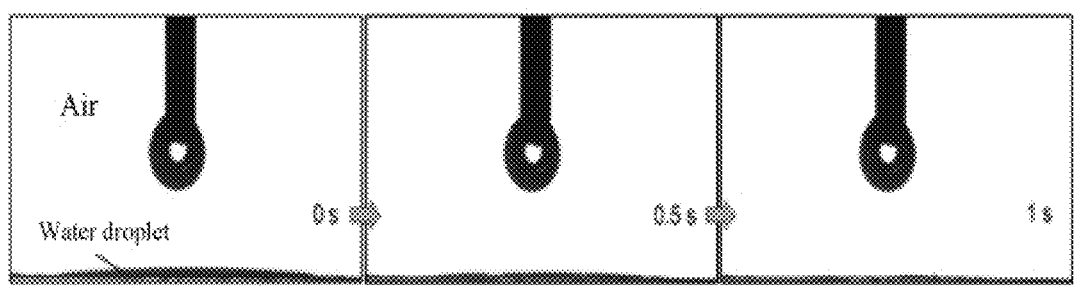
FIG. 5 is a diagram of the dynamic change of water droplets on the super-hydrophilic carbon nanotube composite film.

In order to further illustrate the hydrophilicity, oil-water separation and anti-fouling performance of the super-hydrophilic carbon nanotube composite film 100 provided by the above embodiment, original carbon nanotube films are used for comparison test. Here, the original carbon nanotube films refer to carbon nanotube films that have not been modified. Referring to FIG. 4 and FIG. 5, the water droplets remain spherical on the surface of the original carbon nanotube film, and the contact angle of water droplets to the original carbon nanotube film is 121.8 degrees, and it remains almost unchanged for a long time. Thus, FIG. 4 shows that the original carbon nanotube film is hydrophobic. On the contrary, when the water droplets drops on the super-hydrophilic carbon nanotube composite film 100, the diffusion rate of water is very fast, and the contact angle of the water to the super-hydrophilic carbon nanotube composite film 100 drops to zero within one second. Therefore, the super-hydrophilic carbon nanotube composite film 100 is super-hydrophilic. Because the surface of the super-hydrophilic carbon nanotube composite film 100 is grafted with the plurality of polydopamine nanoparticles and amino-containing silica nanoparticles to form the three-dimensional micro-nano structure, and the three-dimensional micro-nano structure can increase the surface energy and make the super-hydrophilic carbon nanotube composite film 100 have super-hydrophilic properties. At the same time, the three-dimensional micro-nano structure increases the roughness of the surface the super-hydrophilic carbon nanotube composite film 100 and thus greatly improves the hydrophilicity of the super-hydrophilic carbon nanotube composite film 100. Therefore, the super-hydrophilic carbon nanotube composite film 100 can exhibits super-hydrophilicity.

Figure 6:
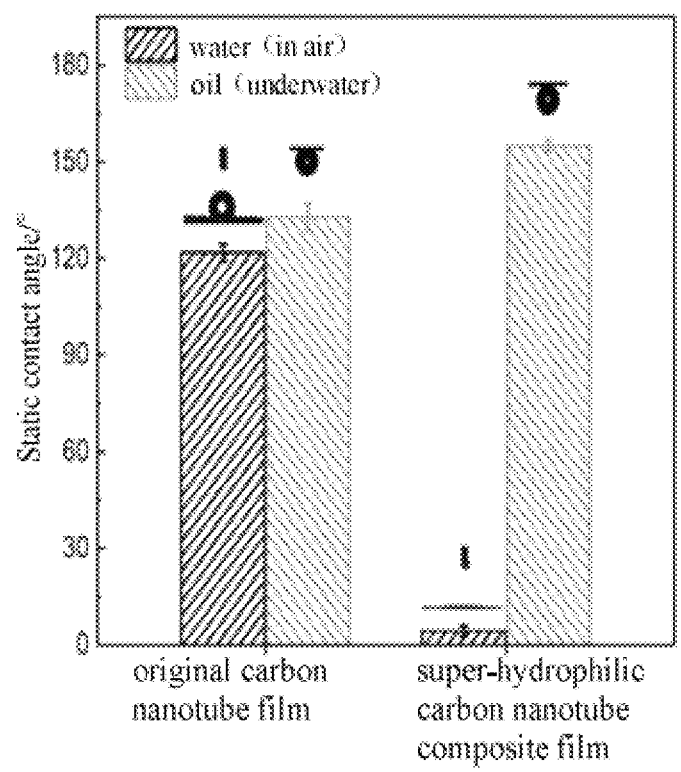
FIG. 6 is a comparison diagram of the contact angles of the original carbon nanotube film and the super-hydrophilic carbon nanotube composite film to water and oil.
Figure 7:
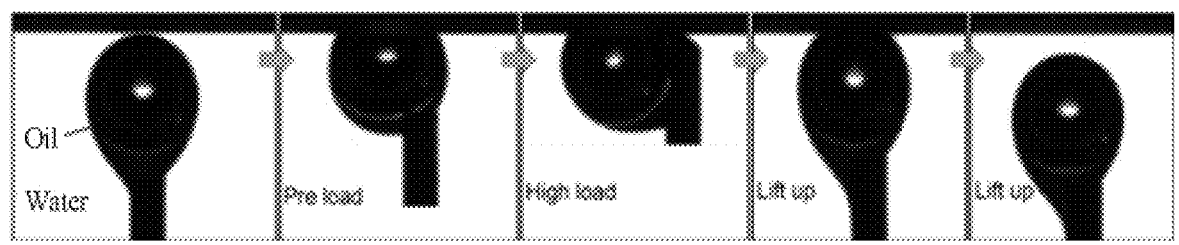
FIG. 7 is an evaluation diagram of underwater oleophobic performance of the super-hydrophilic carbon nanotube composite film.

Referring to FIG. 6, the original carbon nanotube film has hydrophobicity and underwater oleophobicity. The super-hydrophilic carbon nanotube composite film 100 is super-hydrophilic, and the oil contact angle under water is 155 degrees. Therefore, the super-hydrophilic carbon nanotube composite film 100 is super oleophobic underwater. Referring to FIG. 7, the contact process between the underwater oil droplets and the super-hydrophilic carbon nanotube composite film 100 undergoes weak contact, strong contact, lift-off, and lift-off. When oil droplets are in contact with the super-hydrophilic carbon nanotube composite film 100, the oil droplets are deformed significantly, and then the oil droplets are moved away from the super-hydrophilic carbon nanotube composite film 100. In the contact process, even if the oil droplets are in close contact with the surface of the super-hydrophilic carbon nanotube composite film 100, the oil droplets will not stick to the surface of the super-hydrophilic carbon nanotube composite film 100. Therefore, the super-hydrophilic carbon nanotube composite film 100 has excellent low adhesion, that is, the super-hydrophilic carbon nanotube composite film 100 has super anti-fouling performance when separating oil/water mixtures or emulsions.

Figure 8:
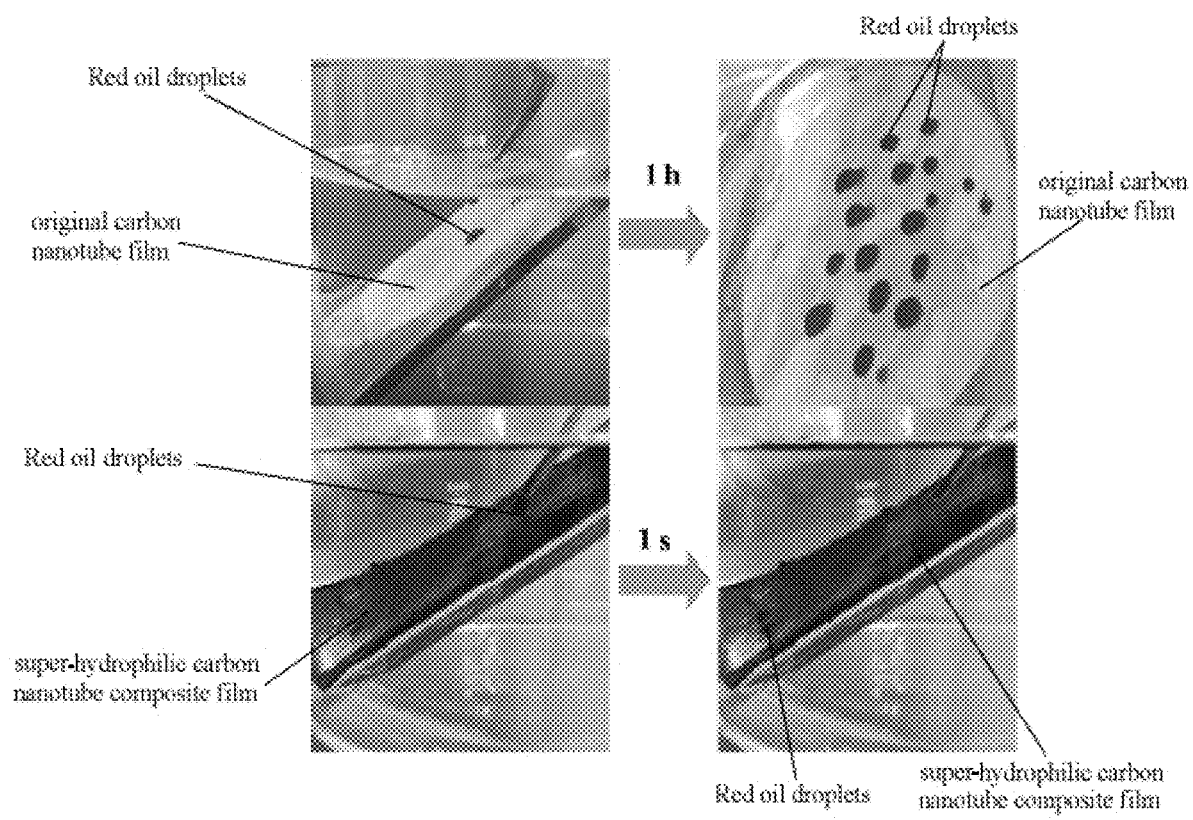
FIG. 8 is a comparison diagram of movements of the red oil droplets adhering to the original carbon nanotube film and the super-hydrophilic carbon nanotube composite film.

In order to further verify the super-oleophobicity of the super-hydrophilic carbon nanotube composite film 100, Sudan III dyed chloroform was used to test the oily behavior of the super-hydrophilic carbon nanotube composite film 100 and the original carbon nanotube film. Referring to FIG. 8, the red oil droplets adhere to the original carbon nanotube film and do not move for a long time; while the red oil droplets are on the surface of the super-hydrophilic carbon nanotube composite film 100, the red oil droplets slip off the surface of the super-hydrophilic carbon nanotube composite film 100 in less than one second. The rapid rolling of the red oil droplets on the super-hydrophilic carbon nanotube composite film 100 indicates that the super-hydrophilic carbon nanotube composite film 100 has ultra-low adhesion and underwater super-oleophobic performance.

Figure 9:
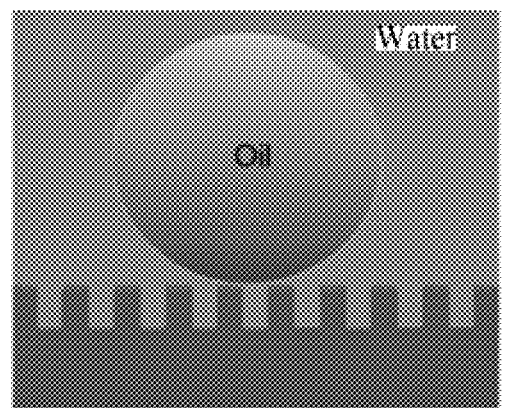
FIG. 9 is a three-phase interface diagram of oil, water and a solid film with a micro-nano structure.

Referring to FIG. 9, water-insoluble oil droplets are placed on the surface of an underwater film with micro-nano structures to form an oil/water/solid three-phase interface. According to the Cassie model equation:

$$\cos \theta'_{oil} = f \cos \theta_{oil} + f - 1,$$

wherein $\theta_{oil}$ represents the underwater oil contact angle (132°), and $\theta'_{oil}$ represents the underwater oil contact angle (155°) of the super-hydrophilic carbon nanotube composite film 100, f represents the ratio of the area of oil droplets in contact with a solid to the total surface area of the solid. The values of $\theta_{oil}$ and $\theta'_{oil}$ are put into the equation to obtain the value of f is 0.056. It means that only 5.6% of the surface area of the solid is in contact with the oil. Therefore, the introduced polydopamine nanoparticles and silica nanoparticles increase the surface roughness of the super-hydrophilic carbon nanotube composite film 100, and the improvement of the surface roughness directly improves the underwater super oleophobic performance of the super-hydrophilic carbon nanotube composite film 100.

Figure 10A:
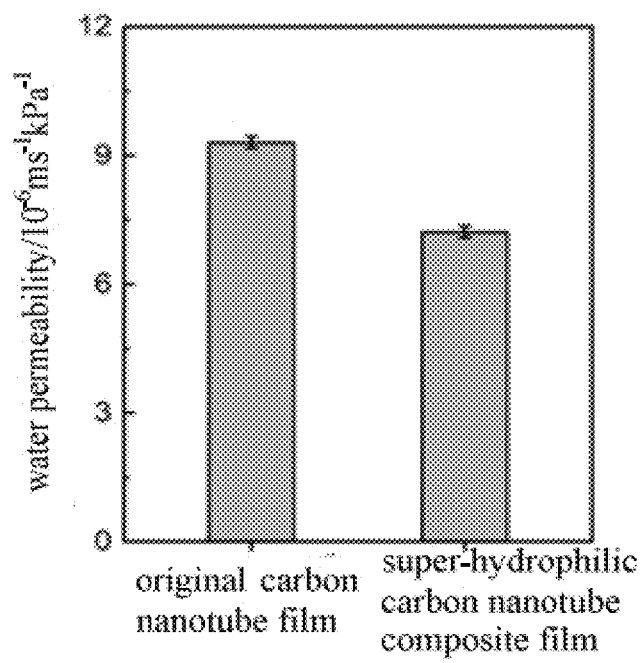
FIG. 10a is a water permeability characterization diagram of the original carbon nanotube film and the super-hydrophilic carbon nanotube composite film.
Figure 10B:
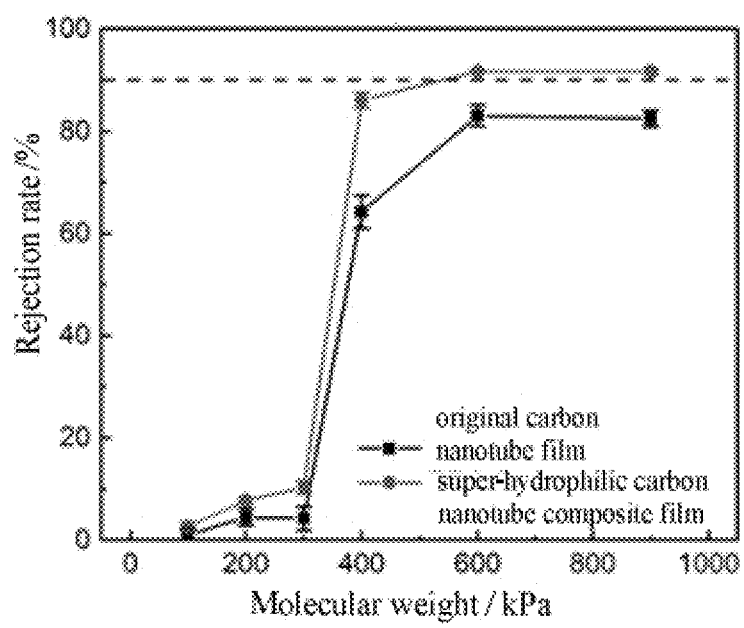
FIG. 10b is a molecular weight of the original carbon nanotube film and the super-hydrophilic carbon nanotube composite film.

Referring to FIG. 10a, both the original carbon nanotube film and the super-hydrophilic carbon nanotube composite film have a high water flux. Compared with the original carbon nanotube film, the water permeability of the super-hydrophilic carbon nanotube composite film does not decrease much. This is related to the increase in the hydrophilicity of the super-hydrophilic carbon nanotube composite film 100. The increase in the hydrophilicity can appropriately offset the decrease in water permeability. Referring to FIG. 10b, the rejection rate of the super-hydrophilic carbon nanotube composite film 100 is higher than that of the original carbon nanotube film. The rejection rate of the super-hydrophilic carbon nanotube composite film 100 can be 90%. The molecular weight of the super-hydrophilic carbon nanotube composite film 100 is in a range from 400 kDa to 700 kDa. It indicates that the pore size of the super-hydrophilic carbon nanotube composite film 100 is small, which can prevent small oil droplets and facilitate oil/water separation.

Figure 11:
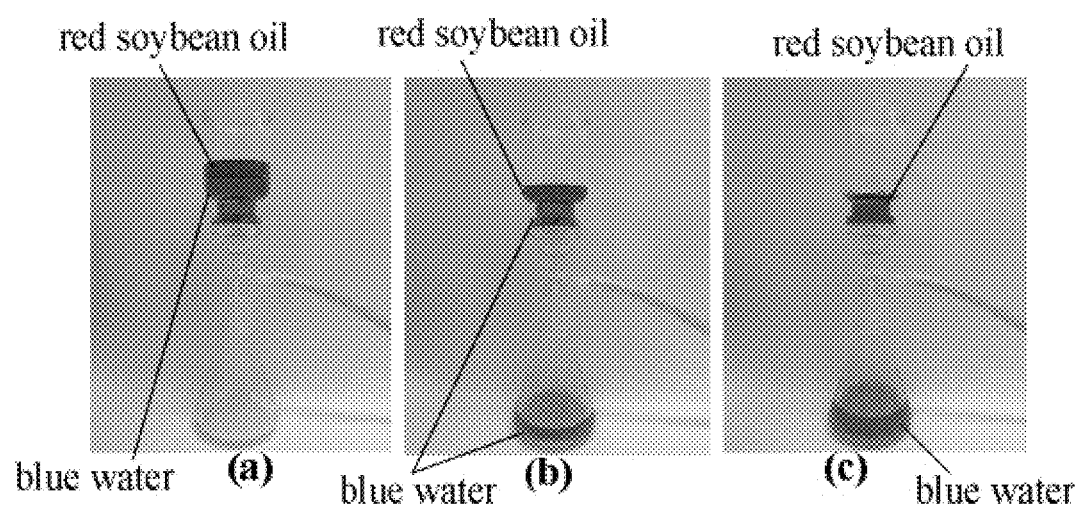
FIG. 11 is an experiment diagram of oil/water separation of the super-hydrophilic carbon nanotube composite film.

Referring to FIG. 11, the super-hydrophilic carbon nanotube composite film 100 is used for an oil/water separation experiment. A mixture of red soybean oil and blue water with a volume ratio of 1:5 is used as a solution to be separated. After the red soybean oil and blue water are mixed for a short time, and the mixture forms an upper layer and a low layer in an upper bottle, the red soybean oil floats in the upper layer, the blue water is in the lower layer, but there are still some small oil droplets in the lower layer. Then the blue water can penetrate through the super-hydrophilic carbon nanotube composite film 100 under negative pressure and is collected in a lower bottle, while the red soybean oil remains in the upper bottle. Even the small oil droplets in the lower layer cannot penetrate into the lower bottle under negative pressure. It indicates that the super-hydrophilic carbon nanotube composite film 100 has higher oil/water separation efficiency. In the oil/water separation process, the red soybean oil can be trapped and retained in the mixture. Since the red soybean oil has a lower density than water, the contact area between the red soybean oil and the super-hydrophilic carbon nanotube composite film 100 can be greatly reduced. At the same time, due to the super-hydrophilic and oleophobicity of the super-hydrophilic carbon nanotube composite film 100, a hydration layer can be formed on the super-hydrophilic carbon nanotube composite film 100, and the hydration layer can reduce the contact area between the red soybean oil and the super-hydrophilic carbon nanotube composite film 100. After the oil/water separation process is completed, the super-hydrophilic carbon nanotube composite film 100 can be immersed in water to remove oil stains. Since the surface of the super-hydrophilic carbon nanotube composite film 100 has a protective hydration layer and has a low affinity for oil, the super-hydrophilic carbon nanotube composite film 100 has a huge self-clearing ability to prevent oil stains. In addition, the super-hydrophilic carbon nanotube composite film 100 can be reused after a simple physical cleaning with water.

Figure 12:
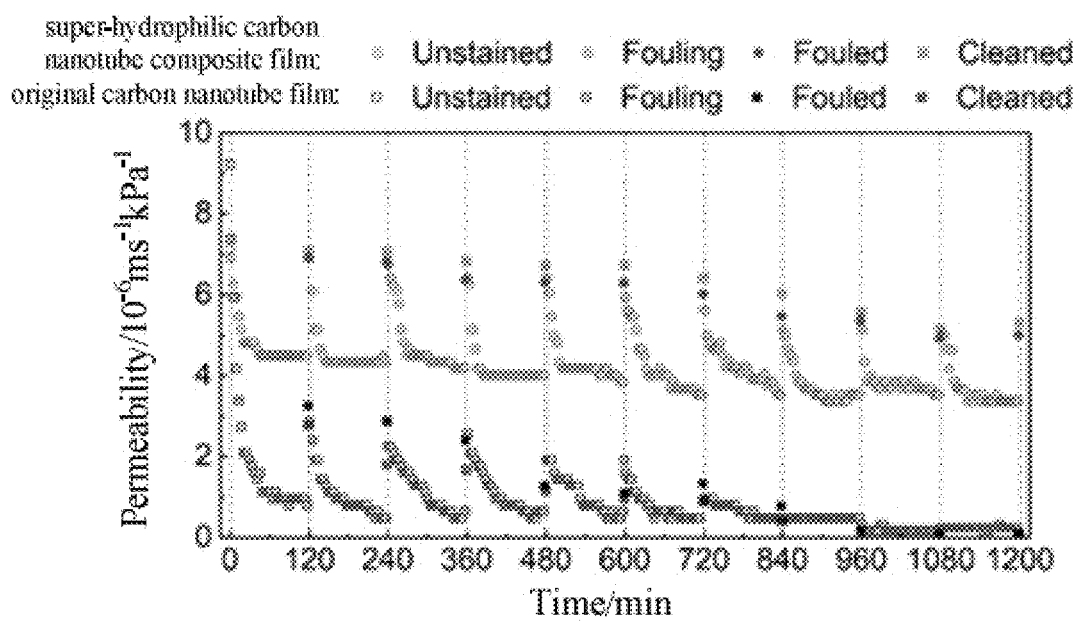
FIG. 12 is a change curve of the super-hydrophilic carbon nanotube composite film and the original carbon nanotube film to oil/water emulsion permeability and water permeability with filtration time.

In order to further illustrate the separation efficiency and long-term antifouling performance of the super-hydrophilic carbon nanotube composite film 100 for a stable oil-in-water emulsion with small droplet sizes, an oil/water emulsion with an average diameter of 5.375 microns is used as an experimental emulsion. FIG. 12 shows the change curve of the super-hydrophilic carbon nanotube composite film 100 and the original carbon nanotube film to oil/water emulsion permeability and water permeability with filtration time. At the beginning, the water permeability of the original carbon nanotube film is higher than that of the super-hydrophilic carbon nanotube composite film 100. In the first cycle, the permeability of the original carbon nanotube film and the super-hydrophilic carbon nanotube composite film 100 both decrease. However, the permeability of the super-hydrophilic carbon nanotube composite film 100 gradually decreases to a steady state within one hour, reaching 63% of an initial permeability of the super-hydrophilic carbon nanotube composite film 100. In contrast, the initial permeability of the original carbon nanotube film is rapidly reduced, and the final permeability is only reduced to 10% of the initial permeability. Because the reason is that the affinity between the original carbon nanotube film and the oil droplets is high, and the oil droplets tend to adhere to the surface of the original carbon nanotube film and block the pores of the original carbon nanotube film. Due to the hydrophobicity of the original carbon nanotube film, it is difficult for water to maintain a high permeability to penetrate the original carbon nanotube film contaminated by oil droplets. After six or seven filtration cycles, the original carbon nanotube film almost lost its filtration ability. However, the super-hydrophilic carbon nanotube composite film 100 always maintains high permeability during ten filtration cycles, and even in the last filtration cycle, the permeability of the super-hydrophilic carbon nanotube composite film 100 is only slightly reduced. Thus, this also shows that the super-hydrophilic carbon nanotube composite film 100 has a high antifouling ability.

Figure 13:
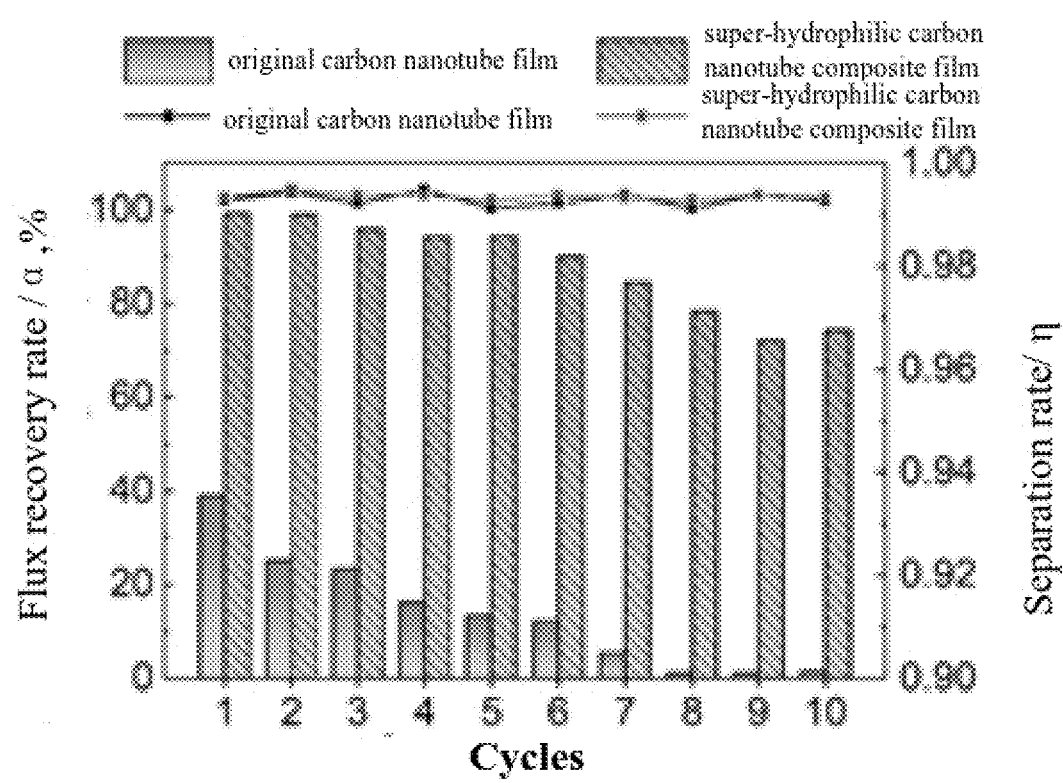
FIG. 13 is a comparison diagram of flux recovery rate and separation rate of the super-hydrophilic carbon nanotube composite film and the original carbon nanotube film after cleaning.

Referring to FIG. 13, after physically cleaning the used the super-hydrophilic carbon nanotube composite film 100 and the original carbon nanotube film, the flux recovery rate of the super-hydrophilic carbon nanotube composite film 100 is much higher than that of the original carbon nanotube film. The water permeability of the super-hydrophilic carbon nanotube composite film 100 is greater than 70% of the initial water permeability of the super-hydrophilic carbon nanotube composite film 100, and the water permeability of the original carbon nanotube film is less than 40% of the water permeability of the original carbon nanotube film. Thus, the oil stains on the surface of the super-hydrophilic carbon nanotube composite film 100 can be easily physically removed, and the adhesion of the oil stains is extremely low. However, since the pores of the original carbon nanotube film are seriously blocked by oil stains, the effective pores are greatly reduced, resulting in a decrease in the water permeability of the original carbon nanotube film. At the same time, the hydrophobicity of the original carbon nanotube film leads to the irreversibility of fouling of the original carbon nanotube film, and the permeability of the original carbon nanotube film also drops sharply. FIG. 13 also shows that the separation efficiency of the super-hydrophilic carbon nanotube composite film 100 and the original carbon nanotube film for oil-water emulsion is both above 99%, thus the super-hydrophilic carbon nanotube composite film 100 and the original carbon nanotube film have excellent oil-water separation capabilities.

Figure 14:
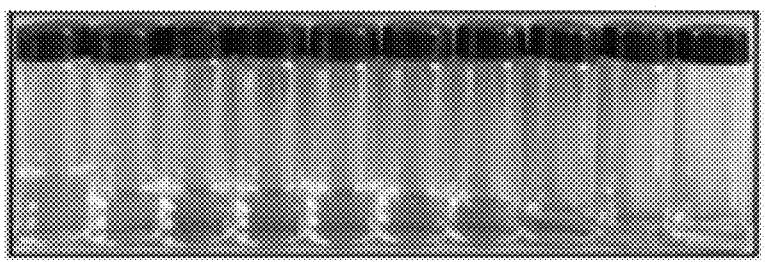
FIG. 14 is a diagram of the separation effect of ten cycles of the super-hydrophilic carbon nanotube composite film and the original carbon nanotube film.
Figure 14:
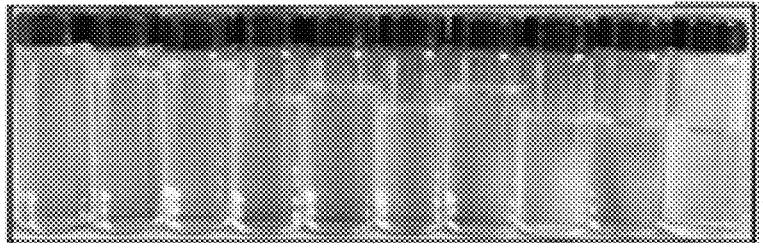

FIG. 14 shows the filtrate conditions and separation effects of the super-hydrophilic carbon nanotube composite film 100 and the original carbon nanotube film for ten cycles. The filtrate volume of the original carbon nanotube film is much smaller than the filtrate volume of the super-hydrophilic carbon nanotube composite film 100. It shows that the permeation permeability of the super-hydrophilic carbon nanotube composite film 100 is much higher than that of the original carbon nanotube film.

Due to the hydrophilic polydopamine nanoparticles and amino-containing silica nanoparticles can modify the carbon nanotube film, the super-hydrophilic carbon nanotube composite film can exhibit hydrophilicity. A spatial micro-nano structure formed by the polydopamine nanoparticles and the amino-containing silica nanoparticles can improve the surface roughness of the carbon nanotube film, thereby increasing the hydrophilicity of the carbon nanotube film. Thus, the carbon nanotube composite film with super hydrophilic and super oleophobic underwater is obtained.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

Depending on the embodiment, certain of the steps of methods described may be removed, others may be added, and the sequence of steps may be altered. The description and the claims drawn to a method may comprise some indication in reference to certain steps. However, the indication used is only to be viewed for identification purposes and not as a suggestion for ordering the steps.

What is claimed is:

1. A super-hydrophilic carbon nanotube composite film comprising:
    a carbon nanotube layer comprising a plurality of carbon nanotubes and defining two opposite surfaces;
    a polydopamine layer located on at least one surface of the two opposite surfaces of the carbon nanotube layer, wherein the polydopamine layer comprises a plurality of polydopamine nanoparticles, and the plurality of polydopamine nanoparticle are located on the plurality of carbon nanotubes;
    a silicon dioxide layer located on a surface of the polydopamine layer away from the carbon nanotube layer, wherein the silicon dioxide layer comprises a plurality of amino-containing silica nanoparticles, and the plurality of amino-containing silica nanoparticles are grafted onto the surface of the polydopamine layer, the average volume of the plurality of amino-containing silica nanoparticles is smaller than that of the plurality of polydopamine nanoparticles.

2. The super-hydrophilic carbon nanotube composite film of claim 1, wherein the carbon nanotube layer comprises at least two carbon nanotube films stacked and intersected to form a plurality of holes.

3. The super-hydrophilic carbon nanotube composite film of claim 2, wherein the super-hydrophilic carbon nanotube composite film defines a plurality of micropores formed by the plurality of carbon nanotubes, the plurality of polydopamine nanoparticles, and the plurality of amino-containing silica nanoparticles.

4. The super-hydrophilic carbon nanotube composite film of claim 2, wherein the super-hydrophilic carbon nanotube composite film defines a plurality of micropores, a size of the plurality of micropores of the super-hydrophilic carbon nanotube composite film is smaller than the size of the plurality of holes of the carbon nanotube layer.

5. The super-hydrophilic carbon nanotube composite film of claim 1, wherein the super-hydrophilic carbon nanotube composite film comprises a first polydopamine layer, a second polydopamine layer, a first silicon dioxide layer and a second silicon dioxide layer.

6. The super-hydrophilic carbon nanotube composite film of claim 5, wherein the first polydopamine layer is on one surface of the two opposite surfaces of the carbon nanotube layer, the second polydopamine layer is on the other surface of the two opposite surfaces of the carbon nanotube layer, the first silicon dioxide layer is on the first polydopamine layer and the second silicon dioxide layer is on the second polydopamine layer.

7. The super-hydrophilic carbon nanotube composite film of claim 1, wherein a diameter of the plurality of polydopamine nanoparticles ranges from 20 nanometers to 30 nanometers.

8. The super-hydrophilic carbon nanotube composite film of claim 1, wherein a diameter of the plurality of amino-containing silica nanoparticles ranges from 10 nanometers to 20 nanometers.

9. The super-hydrophilic carbon nanotube composite film of claim 1, wherein the plurality of amino-containing silica nanoparticles are grafted onto the plurality of the polydopamine nanoparticles.

10. The super-hydrophilic carbon nanotube composite film of claim 1, wherein a molecular weight of the super-hydrophilic carbon nanotube composite film is in a range from 400 kDa to 700 kDa.

11. A method of making a super-hydrophilic carbon nanotube composite film comprising:
    providing at least two stacked and crossed primary carbon nanotube films, and densifying the at least two stacked and crossed primary carbon nanotube films to obtain a carbon nanotube layer, wherein the carbon nanotube layer defines two opposite surfaces;
    coating a dopamine aqueous solution on at least one surface of the carbon nanotube layer to form a polydopamine layer; and
    providing an amino-containing silica nanoparticle suspension, placing the carbon nanotube layer with the polydopamine layer in the amino-containing silica nanoparticle suspension to form a silicon dioxide layer on a surface of the polydopamine layer away from the carbon nanotube layer, the silicon dioxide layer is formed on the surface of the polydopamine layer by a Michael addition reaction.

12. The method of claim 11, wherein the step of coating the dopamine aqueous solution on the at least one surface of the carbon nanotube layer further comprises: polymerizing the dopamine aqueous solution and oxygen after coating the dopamine aqueous solution on at least one surface of the carbon nanotube layer.

13. The method of claim 11, wherein a method of forming the amino-containing silica nanoparticle suspension comprises:
    dispersing silica nanoparticles in a ultrapure water to obtain a silica nanoparticle suspension;

dropping 3-aminopropyl-trimethoxysilane into the ultra-pure water to obtain a silane solution;

mixing the silica nanoparticle suspension and the silane solution to form a mixture, and adjusting a pH of the mixture to 5; and heating and stirring the mixture.

14. The method of claim 11, wherein the polydopamine layer comprises a plurality of polydopamine nanoparticles, the carbon nanotube layer comprises a plurality of carbon nanotubes, and the plurality of polydopamine nanoparticles are distributed on surfaces of the plurality of carbon nanotubes.

\* \* \* \* \*